(12) United States Patent
McNamara et al.

(10) Patent No.: US 8,086,285 B2
(45) Date of Patent: Dec. 27, 2011

(54) CARRYING CASES HAVING SOUND ENHANCING CAPABILITY, FOR PORTABLE COMMUNICATION DEVICES

(75) Inventors: Theodore J. McNamara, Milwaukee, WI (US); Mark A. Hargarten, Cedarburg, WI (US)

(73) Assignee: TJM Innovations, LLC, Milwaukee, WI (US)

( * ) Notice: Subject to any disclaimer, the term of this patent is extended or adjusted under 35 U.S.C. 154(b) by 311 days.

(21) Appl. No.: 12/371,945

(22) Filed: Feb. 17, 2009

(65) Prior Publication Data

US 2010/0206923 A1    Aug. 19, 2010

(51) Int. Cl.
*H04M 1/00*    (2006.01)
(52) U.S. Cl. ............... 455/575.1; 455/575.4; 455/575.8; 455/90.3; 381/160; 381/337; 379/426; 379/428.01; 379/433.11
(58) Field of Classification Search .............. 455/575.1, 455/575.4, 575.8, 90.3; 381/160, 337; 379/426, 379/428.01, 433.11, 433.12, 437, 440
See application file for complete search history.

(56) References Cited

U.S. PATENT DOCUMENTS

| 6,567,677 | B1 | 5/2003 | Sokoloff |
| 2005/0227533 | A1 | 10/2005 | Gartrell |
| 2007/0223745 | A1 * | 9/2007 | Feng et al. .................... 381/160 |

FOREIGN PATENT DOCUMENTS

| EP | 1583391 | 10/2005 |
| WO | WO 02/04251 | 1/2002 |
| WO | WO 2005/053355 | 6/2005 |

OTHER PUBLICATIONS

Seven pages of a PCT ISR report in the corresponding application PCT/US2010/020610, dated Apr. 20, 2010.

* cited by examiner

*Primary Examiner* — Patrick Edouard
*Assistant Examiner* — Julio Perez
(74) *Attorney, Agent, or Firm* — Quarles & Brady LLP

(57) ABSTRACT

Carrying cases are disclosed for portable communication devices such as iPhones and cell phones. There is a case housing for receiving a portable communication device therein, and a sound reflector linked to the housing so as to be movable between an extended position and a recessed position. The carrying case enables the device to be used as a speaker phone with enhanced sound quality, while still in the case.

9 Claims, 5 Drawing Sheets

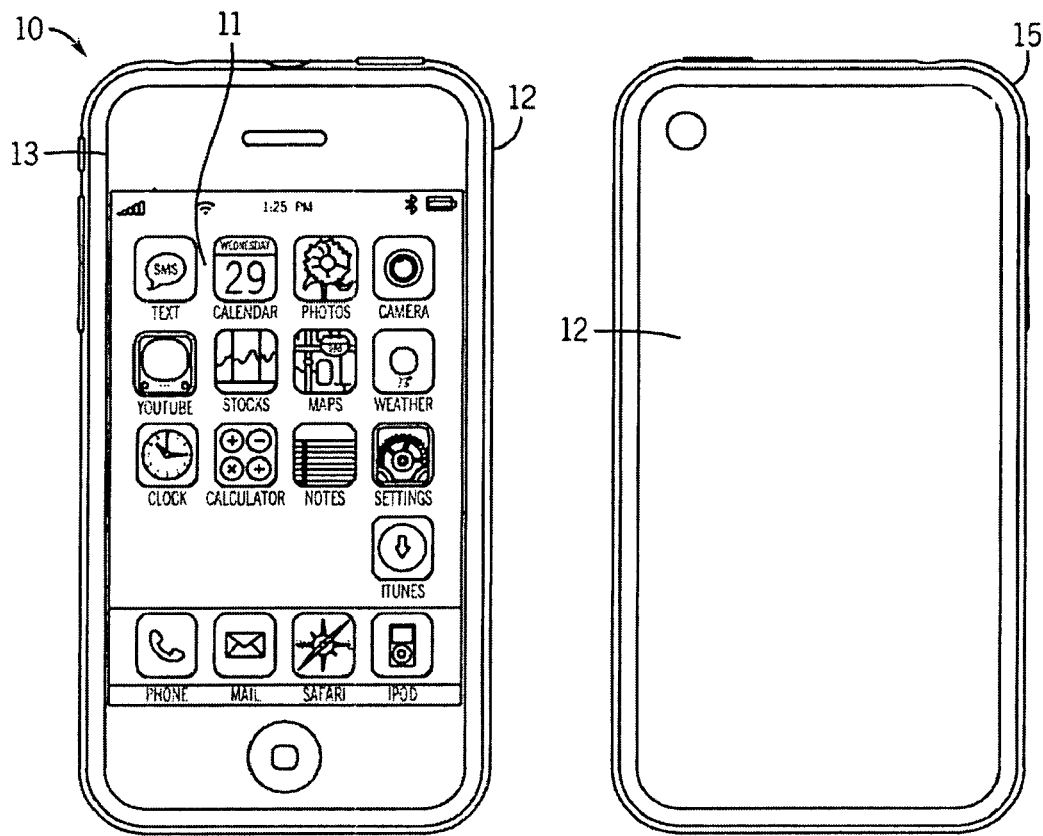
FIG. 1
PRIOR ART
FIG. 2
PRIOR ART
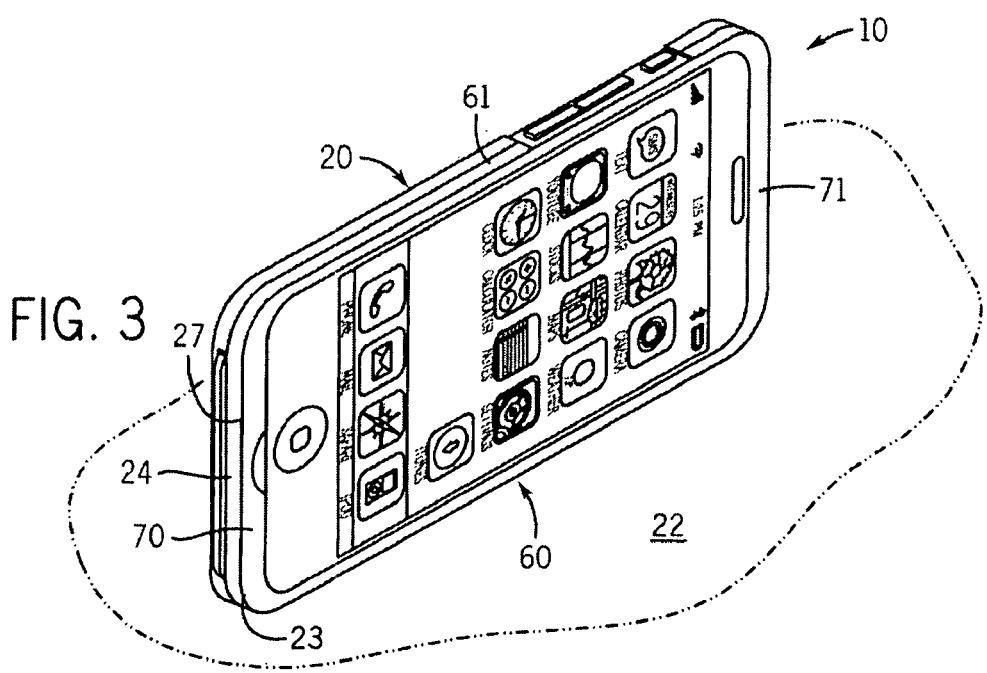
FIG. 3

US 8,086,285 B2

CARRYING CASES HAVING SOUND ENHANCING CAPABILITY, FOR PORTABLE COMMUNICATION DEVICES

CROSS-REFERENCE TO RELATED APPLICATION

Not applicable.

STATEMENT OF FEDERALLY SPONSORED RESEARCH OR DEVELOPMENT

Not applicable.

BACKGROUND OF THE INVENTION

The present invention relates to compact (e.g. pocket size) portable communication devices such as cellular phones, iPhone® communication devices, personal digital assistant ("PDA") devices, and the like. More particularly it relates to carrying cases for such devices which have enhanced capabilities.

Pocket-size communication devices have been developed which permit communication of audio, and sometimes also text and/or video. Because these devices are designed to be carried by consumers they are sometimes banged or dropped. The art has therefore developed protective cases in which the device is housed between uses, and in some cases even during use.

A significant problem with such devices is their sound quality. This can sometimes be due to weak cellular service. However, even with adequate cellular service the speakers typically provided with such devices may not be particularly effective. To some extent this has been addressed in some of the more expensive devices by using better quality speakers, or providing an optional speaker phone setting to project more energy through the speaker when the device is to be used as a speaker phone. However, even these latter devices can have significant deficiencies, particularly when the devices are used in large conference rooms.

Another problem occurs when some conventional protective cases are used. They can muffle or otherwise interfere with sound quality unless the device is remove from the case when used.

Thus, a need exists for improvements in the sound quality of portable communication devices, particularly where the devices are in protective cases when used as a speaker phone.

SUMMARY OF THE INVENTION

The present invention provides carrying cases for portable communication devices. Each case has a housing for receiving the portable communication device therein. There is also a sound reflector linked to the housing so as to be movable between an extended position and a recessed position.

When extended the sound reflector enhances sound quality, and thus helps the device to be used as a speaker phone. When the sound reflector is retracted, the case and device assume such a compact configuration that they can easily be transported in a pocket.

In a preferred form the housing has a front clamshell portion and a rear clamshell portion. These can be snapped, hinged, or otherwise connected together after the communication device is inserted in the housing. The front clamshell portion can have a front aperture forming a frame for a front of the portable communication device, when the portable communication device is positioned in the housing. This would be particularly desirable if the device is of a type having a large viewing screen, or has a set of control buttons or keys, such as an iPhone or PDA has.

The sound reflector is positioned in a receiving pocket of the case housing and is capable of extending out an end aperture of the housing when the sound reflecting capability is to be used. It can be in the form of a panel having a raised cylindrical projection, where the housing has an elongated slot for receiving the projection, and movement of the projection in the slot guides movement of the sound reflector relative to the housing, while also linking the parts together. The sound reflector may also have another raised projection adjacent an end of the reflector suitable for assisting a consumer in pulling the sound reflector out of its pocket.

Other possible refinements include a cutout/cove formed in the housing that the raised projection can reside in when the sound reflector is in the recessed position, and a panel portion of the sound reflector having a forwardly extending arcuate bend in it. The bend helps "scoop" the sound and enhance it, while also projecting the sound in a desired direction.

In other forms the housing may have an opening adjacent where the sound reflector extends out such that if a portable communication device is positioned in the case a speaker of that device will be positioned adjacent that opening (to direct sound out the opening and directly against the sound reflector).

The carrying case can have a generally flat surface on one peripheral side which will permit the case to stand on that side if a portable communication device is positioned in the case. This allows one to stand the device up as a speaker phone at the center of a table.

The present invention thus provides protective cases for portable communication devices where the cases also facilitate sound enhancement, thereby facilitating use of the devices as speaker phones. This can be achieved at low cost, without requiring a case to be removed during use of the device, and without significantly compromising the compactness of the design when transporting the device.

These and still other advantages of the present invention will become more apparent, and the invention will be better understood, by reference to the following description of preferred embodiments of the present invention taken in conjunction with the accompanying drawings

BRIEF DESCRIPTION OF THE DRAWINGS

FIG. 1 is a front view of a prior art portable communication device which is housed in a prior art protective case;

FIG. 2 is a rear view thereof;

FIG. 3 is a perspective view of the FIG. 1 portable communication device, but when mounted instead in a carrying case of the present invention, and then positioned on its side on a conference table;

DETAILED DESCRIPTION OF THE PREFERRED EMBODIMENT

Figure 4:
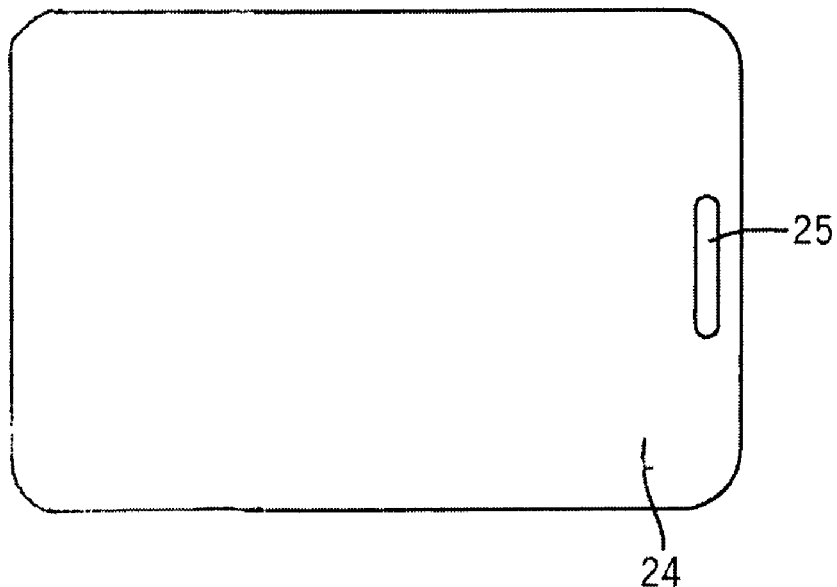
FIG. 4 is a rear view of a sound reflector of the present invention.

Referring first to FIGS. 1 and 2, there is shown a prior art portable communication device 10 in the form of an iPhone. This device has a front control screen 11, and typically one or more speakers along its lower peripheral edge (not shown).

Device 10 is shown mounted in a prior art carrying case 12 that has a generally continuous rear, a frontal frame with a large access window 13, and for most of the periphery a connecting web 15 between the rear and front frame.

While the carrying cases of the present invention are particularly well suited for use with iPhones, they could instead be, among other things, used with a simple cell phone with no video or text capability, or a PDA with audio and text capability but no other video capability.

In any event, FIG. 3 shows portable communication device 10 positioned in a preferred carrying case 20 of the present invention. The carrying case 20 is shown standing on its side, on a table 22. There is a retractable/extendible sound reflector 24 which is mounted adjacent a lower end 23 of the assembled case in a pocket 27 of the case housing.

As can be seen from FIG. 4, sound reflector 24 is a generally rectangular panel in rear view, with an elongated grip tab 25 extending rearwardly therefrom. Sound reflector 24 preferably arcuately bends forward somewhat (e.g. at the ends), albeit not so much so as to preclude insertion of the sound reflector 24 into the case 20.

Figure 5:
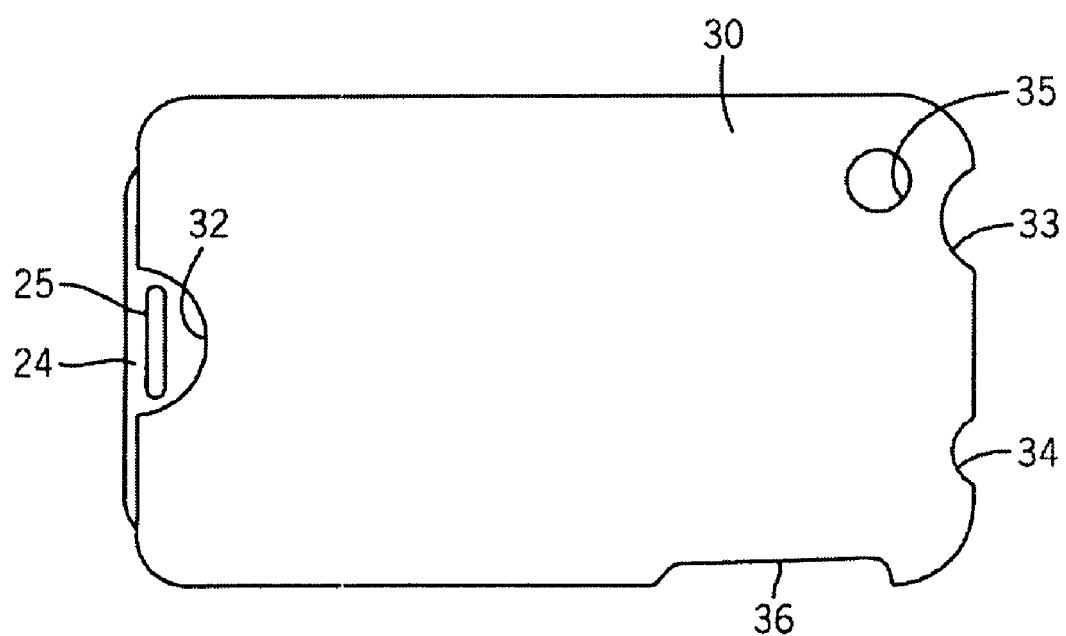
FIG. 5 is a rear view of a rear clamshell part of the case housing, showing the FIG. 4 sound reflector mounted therein in a retracted position.

As shown in FIG. 5 (a rear view of a rear clamshell part 30), the sound reflector 24 can in the retracted position fit almost entirely in a side pocket 27 of the rear clamshell part 30, with elongated grip tab 25 accommodated in a cove-type cutout 32. The rear clamshell part 30 also may have various other openings 33, 34, 35, 36 to permit access to various parts of the portable communication device when in the case (e.g. recharging ports, output linkages, volume controls, etc.).

Figure 6:
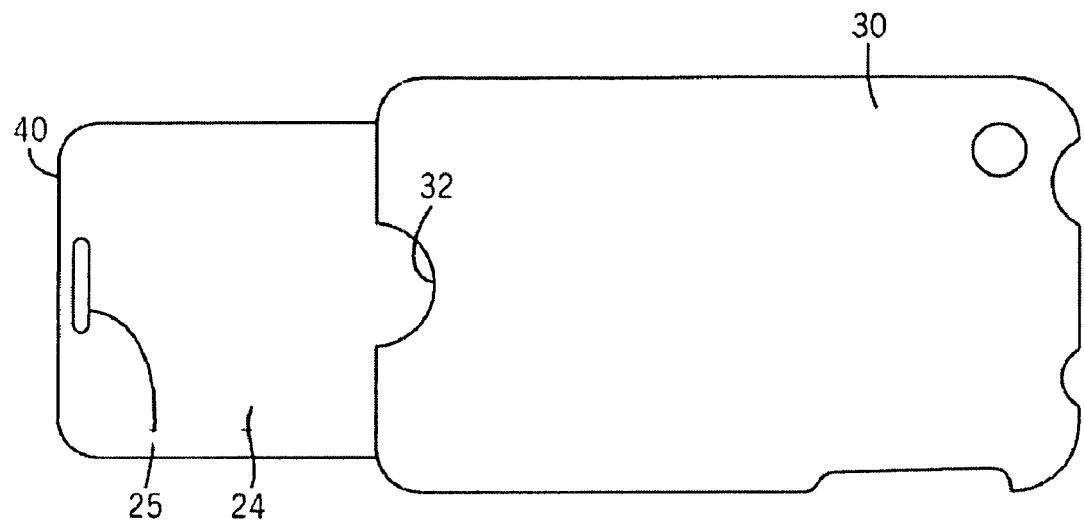
FIG. 6 is a view similar to FIG. 5, but showing the sound reflector in an extended position.

Turning next to FIG. 6, the sound reflector 24 is shown fully extended outward. In this configuration the grip tab 25 is now positioned well outside of cutout/cove 32. It should be appreciated that when a user wishes to extend the sound reflector they can use a finger nail against the grip tab 25 to drag the sound reflector 24 somewhat out, and then grip edge 40 of the reflector to pull it the rest of the way out.

Figure 7:
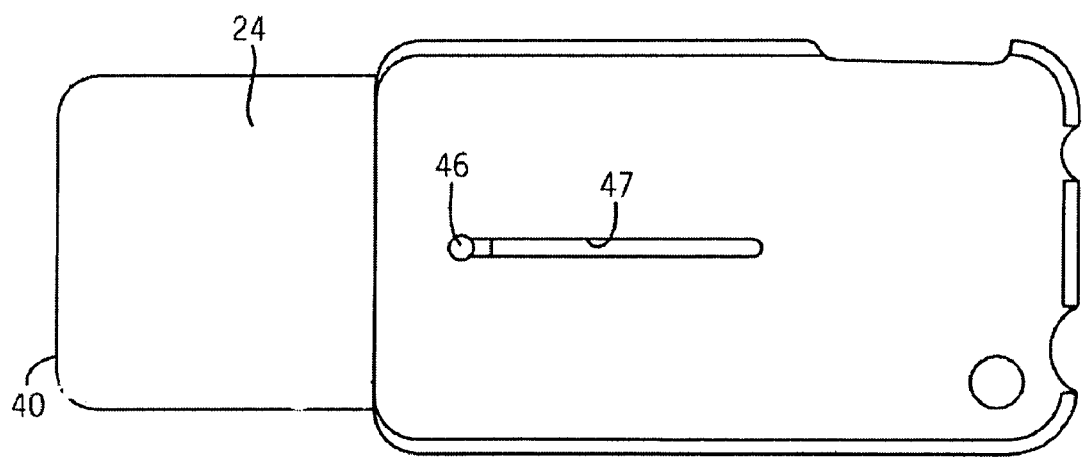
FIG. 7 is a frontal view of the FIG. 6 parts, in the FIG. 6 configuration.

In FIG. 7 the FIG. 6 parts are shown still in the FIG. 6 position. However, the sound reflector also has on its forward surface a cylindrical guide projection 46 adjacent its inward end. The projection 46 pokes out into and rides in an elongated guide slot 47 of the rear clamshell part 30.

The rear clamshell part and the sound reflector are made of slightly flexible plastic so that the projection 46 can be forced into the receiving pocket of the rear clamshell housing until the projection 46 snaps into slot 47. PVC plastic or rubberized plastic are preferred.

Figure 8:
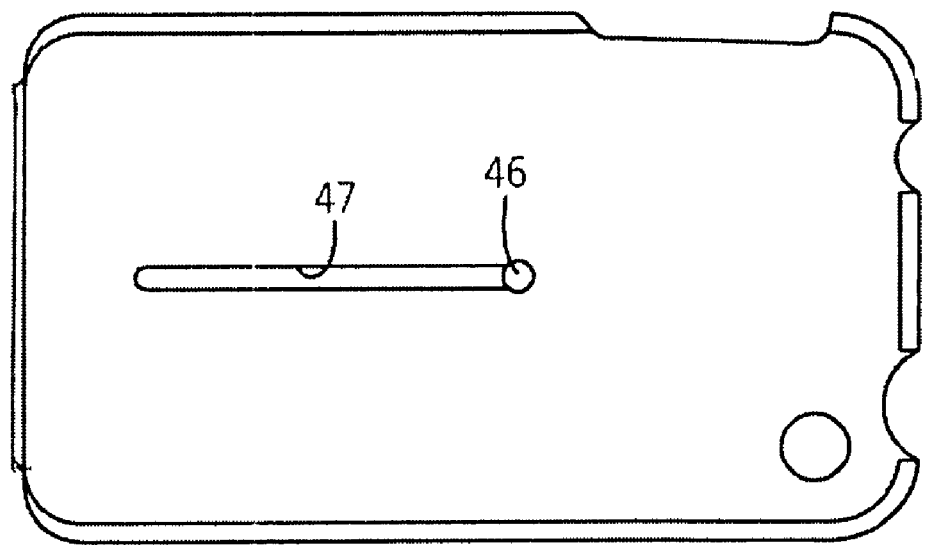
FIG. 8 is a view similar to FIG. 7, but with the parts in the FIG. 5 position.

Comparing FIGS. 7 and 8, note how the projection 46 moves in the slot 47 as the sound reflector 24 is retracted, and that in the FIG. 8 position the sound reflector does not take up significant additional room (and thereby frustrate transporting the device 10 in one's pocket). In the FIG. 7 position the reflector is extended and bends/arcs forward somewhat to collect, scoop and enhance the sound emanating from the device 10.

Figure 9:
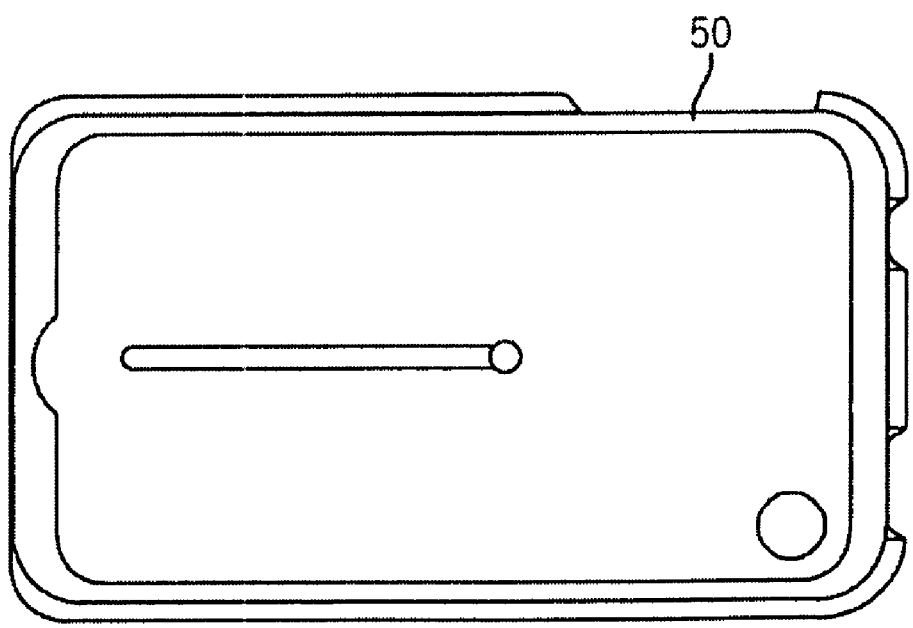
FIG. 9 is a view similar to FIG. 8, but with a frontal framing clamshell snapped on to the rear clamshell portion.
Figure 10:
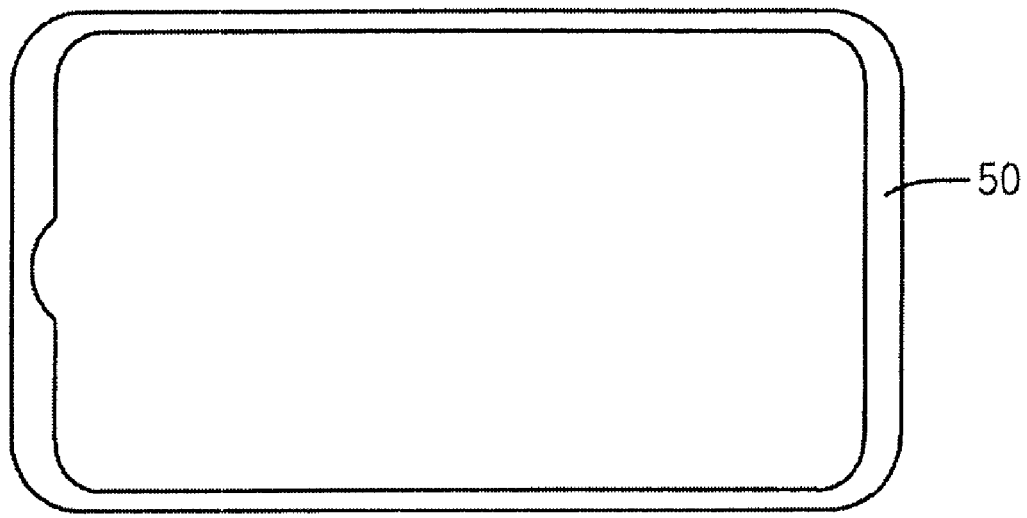
FIG. 10 is a frontal view of the FIG. 9 framing clamshell by itself.
Figure 11:
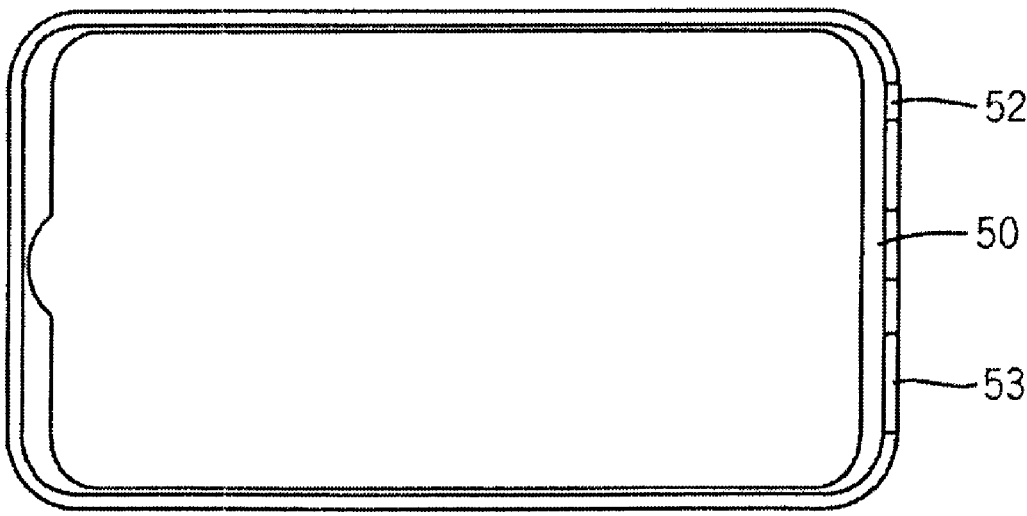
FIG. 11 is a rear elevational view thereof.

FIGS. 9-11 show a frontal frame form clamshell part 50. It can be snapped onto the rear clamshell part 30 after the device 10 has been positioned as shown in FIG. 8. This serves to protect the peripheral sides and front edges of the device 10, as well as to hold the device in the case 20. Various recesses and cutouts 52, 53 can be provided in part 50 to accommodate access to various features of the device (such as recharging ports and output ports).

In an alternative embodiment the case housing could instead have a one-piece construction in the form of a pocket. However, we prefer a two-piece clamshell construction for most applications.

Also optionally, at edge 60 of the FIG. 3 case the housing parts can be formed with flattened edges rather than rounded edges. This will more easily enable the device to stand on its side on a table 22.

Alternatively, the rear clamshell part 30 can be provided with an easel type erectable/collapsible stand so that even a casing with contoured sides can stand up in the FIG. 3 position.

Where the portable communication device 10 has a speaker along a different peripheral edge (such as elongated side edge 61 of a FIG. 3 type case), the retractable sound reflector could instead be extendable out from the side adjacent thereto, with the casing being stood up on a table in the FIG. 1 position.

Moreover, for devices having speakers adjacent both opposed ends 70 and 71, multiple sound reflectors could be used (with the reflectors extending out somewhat like wings). Also, while a gently contoured sound reflector is preferred, the reflector could instead have other bend configurations for particular sound enhancement needs.

Further variations are also contemplated. The projection and slot system for guiding the sound reflector and holding it in the rear clamshell housing is merely preferred, not required.

Hence, to ascertain the full scope of the invention the claims which follow should be referenced.

INDUSTRIAL APPLICABILITY

The invention provides improved carrying/protective cases for portable communication devices, where the devices are enabled to function as speaker phones with enhanced sound quality even when still in the protective cases.

We claim:

1. A carrying case for a portable communication device, the carrying case comprising:
   a housing for receiving the portable communication device therein; and
   a sound reflector linked to the housing so as to be slidable relative to the housing between an extended position and a recessed position;
   wherein the sound reflector is in a form of a panel having a raised projection, the housing has a slot for receiving the projection, and movement of the raised projection in the slot guides movement of the sound reflector relative to the housing;
   wherein the housing has a front clamshell portion and a rear clamshell portion;
   wherein the front clamshell portion links onto the rear clamshell portion; and
   wherein the front clamshell portion has an aperture forming a frame for a front of the portable communication device when the portable communication device is positioned in the housing.

2. A carrying case for a portable communication device, the carrying case comprising:
   a housing for receiving the portable communication device therein; and a sound reflector linked to the housing so as to be slidable relative to the housing between an extended position and a recessed position;

wherein the sound reflector is in a form of a panel having a raised projection, the housing has a slot for receiving the projection, and movement of the raised projection in the slot guides movement of the sound reflector relative to the housing;

wherein the housing has a front clamshell portion and a rear clamshell portion;

wherein the front clamshell portion snap links onto the rear clamshell portion; and wherein the front clamshell portion has an aperture forming a frame for a front of the portable communication device when the portable communication device is positioned in the housing.

3. The carrying case of claim 2, wherein the sound reflector is capable of sliding into a pocket of the housing through an end aperture of the housing.

4. The carrying case of claim 2, wherein the sound reflector has a raised projection adjacent an end of the sound reflector suitable for assisting a consumer to move the sound reflector.

5. The carrying case of claim 4, wherein there is a cove formed in the housing that the raised projection can reside in when the sound reflector is in the recessed position.

6. The carrying case of claim 2, wherein the sound reflector has a bend in it suitable to project sound emanating from the portable communication device in an enhanced fashion.

7. The carrying case of claim 6, wherein the bend is an arcuate one.

8. The carrying case of claim 2, wherein the housing has an opening adjacent where the sound reflector extends out from the case such that when a portable communication device is positioned in the case a speaker of that device can be positioned adjacent that opening to direct sound out the opening and against the sound reflector.

9. The carrying case of claim 2, wherein the case has a flattened surface on a side periphery which will permit the case to stand on that side when a portable communication device is positioned in the case.

\* \* \* \* \*